US010691809B2

(12) United States Patent
Okihara

(10) Patent No.: US 10,691,809 B2
(45) Date of Patent: Jun. 23, 2020

(54) INFORMATION PROCESSING APPARATUS AND METHOD FOR CONTROLLING THE SAME

(71) Applicant: CANON KABUSHIKI KAISHA, Tokyo (JP)

(72) Inventor: Kenichi Okihara, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 15/053,564

(22) Filed: Feb. 25, 2016

(65) Prior Publication Data
US 2016/0259944 A1 Sep. 8, 2016

(30) Foreign Application Priority Data
Mar. 2, 2015 (JP) .................. 2015-040749

(51) Int. Cl.
G06F 21/00 (2013.01)
G06F 21/57 (2013.01)
G06F 21/55 (2013.01)
G06F 21/31 (2013.01)
G06F 21/44 (2013.01)
G06F 21/56 (2013.01)
G06F 21/62 (2013.01)

(52) U.S. Cl.
CPC ............ G06F 21/577 (2013.01); G06F 21/31 (2013.01); G06F 21/445 (2013.01); G06F 21/552 (2013.01); G06F 21/554 (2013.01); G06F 21/56 (2013.01); G06F 21/6281 (2013.01); G06F 2221/034 (2013.01); G06F 2221/2113 (2013.01)

(58) Field of Classification Search
CPC ................ G06F 21/577; G06F 21/31

USPC ............................................................. 726/1
See application file for complete search history.

(56) References Cited

U.S. PATENT DOCUMENTS

| 8,443,191 B2* | 5/2013 | Beckwith .............. H04L 9/3294 713/167 |
| 8,762,344 B2* | 6/2014 | Esaka ................. G06F 11/1464 707/652 |
| 2004/0103317 A1* | 5/2004 | Burns ..................... G06F 21/31 726/9 |
| 2005/0120219 A1† | 6/2005 | Munetoh et al. |
| 2008/0127292 A1† | 5/2008 | Cooper et al. |
| 2015/0213281 A1* | 7/2015 | Tang ..................... G06F 21/606 345/1.2 |
| 2016/0099953 A1† | 4/2016 | Hebert et al. |

FOREIGN PATENT DOCUMENTS

| JP | 2003-233521 A | 8/2003 |
| JP | 2006-518893 A | 8/2006 |
| JP | 2012-18102 A | 1/2012 |
| JP | 2012-178137 A | 9/2012 |

* cited by examiner
† cited by third party

Primary Examiner — Longbit Chai
(74) Attorney, Agent, or Firm — Canon U.S.A., Inc., IP Division

(57) ABSTRACT

An information processing apparatus, including a function of mandatory access control, includes a storage unit that stores a security policy for managing access by the mandatory access control, an obtaining unit that obtains information on vulnerability of an application, and an updating unit that updates the security policy by a function of a kernel thread in accordance with the information obtained by the obtaining unit.

20 Claims, 10 Drawing Sheets

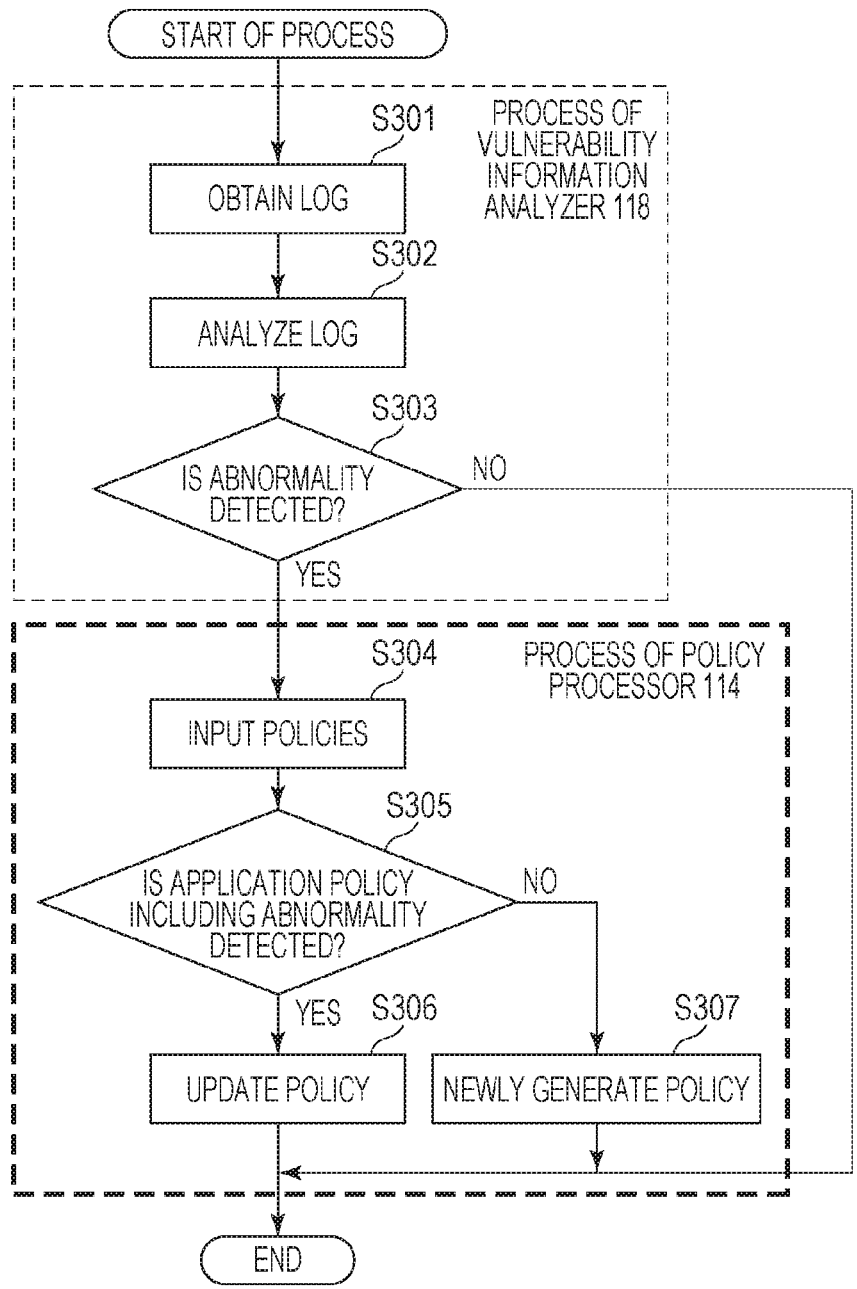

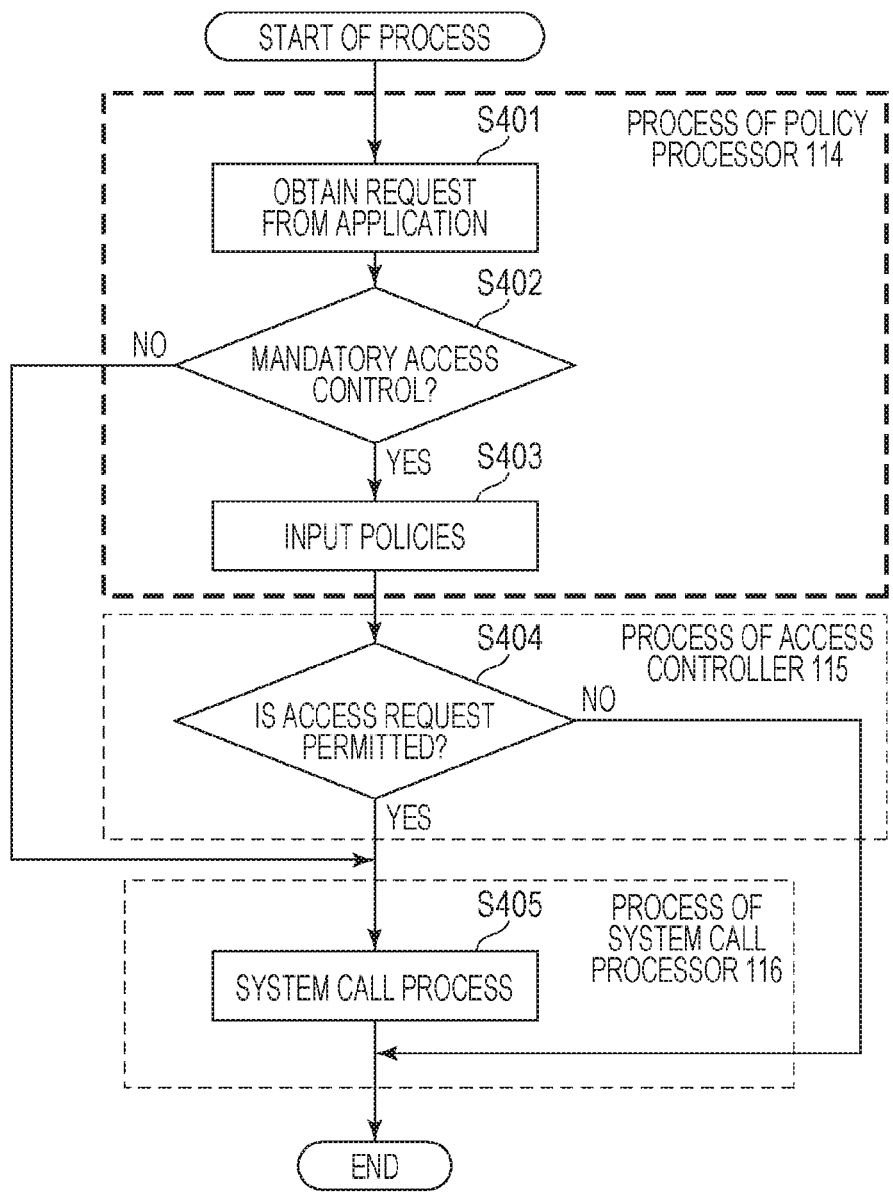

FIG. 6A

```
/usr/bin/App1 {                    — 601a
    /usr/bin/App1 read,            — 601c
    /usr/local/user_data/* read,   — 601d
    /usr/local/user_data/* write,
    ...
}                                  — 601b
```
— 601

FIG. 6B

```
/usr/bin/App1 {                         — 602a
    /usr/bin/App1 read,
    /usr/local/user_data/* read,        — 602b
    /usr/local/user_data/* write,
    deny /usr/local/user_data/text.txt read,
    ...
    deny network XXX.XXX.XXX.YYY ALL    — 602c
}
```
— 602

FIG. 6C

```
/usr/bin/App1 {                         — 603a
    /usr/bin/App1 read,
    deny /usr/local/user_data/* read,   — 603b
    deny /usr/local/user_data/* write,
    deny network OUTSIDE_IP_ALL ALL     — 603c
}
```
— 603

FIG. 6D

```
/usr/bin/App1 {                              — 604a
    /usr/bin/App1 read,
    /usr/local/user_data/* read,
    /usr/local/user_data/* write,            — 604b
    deny /usr/local/user_data/hoge_data1 read,
}
```
— 604

FIG. 7A

```
PARTIALLY OMITTED
Jun 30 15:33:29 localhost App1:read /usr/local/user_data/text.txt
Jun 30 15:33:29 localhost App1:read /usr/local/user_data/text.txt
Jun 30 15:33:29 localhost App1:read /usr/local/user_data/text.txt
Jun 30 15:33:29 localhost App1:read /usr/local/user_data/text.txt
Jun 30 15:33:29 localhost App1:read /usr/local/user_data/text.txt
PARTIALLY OMITTED
Jun 30 15:34:12 localhost App1:read /usr/local/user_data/text.txt
Jun 30 15:34:12 localhost App1:read /usr/lib/app2.a
Jun 30 15:33:34 localhost App2:read /usr/lib/app2.a
THE REST IS OMITTED
```
701a { ACCESS TO text.txt IS PERFORMED 140 TIMES

```
PARTIALLY OMITTED
Jun 30 18:33:29 XXX.XXX.XXX.YYY App1:read /usr/bin/App1
Jun 30 18:33:34 XXX.XXX.XXX.YYY App2:read /usr/lib/app2.a
Jun 30 18:33:41 XXX.XXX.XXX.YYY App3:read /usr/bin/App3
PARTIALLY OMITTED
Jun 30 18:56:29 XXX.XXX.XXX.YYY App1:read /usr/bin/App1
THE REST IS OMITTED
```
702a { ACCESS FROM UNKNOWN IP ADDRESS "XXX.XXX.XXX.YYY" IS PERFORMED 30 TIMES

```
Original release date: XX/XX/2014
Last revised: XX/XX/2014
Source: US-CERT/NIST                801a
Overview
 func hoge  in App1 before 5 ..........
Impact                    801b
CVSS Severity (version 2.0):
 CVSS v2 Base Score: 4.3(MEDIUM) (AV:N/AC:M/Au:N/C:P/I:N/A:N) (legend)
                                              801c
THE REST IS OMITTED
```

| APPLICATION NAME | VERSION |
|---|---|
| App1 | 4.2 |
| App2 | 5.4 |
| ..... | ..... |

802a    802b

802

INFORMATION PROCESSING APPARATUS AND METHOD FOR CONTROLLING THE SAME

BACKGROUND

Field

Aspects of the present invention generally relate to an information processing apparatus including a mandatory access control function and a method for controlling the information processing apparatus.

Description of the Related Art

In a general computer system, an authority of a system administrator is normally required for access to important information in the system. Therefore, only the system administrator may access the important information in the system, and accordingly, the computer system is prevented from being altered by a malicious person.

However, there is a risk that the computer system may be easily altered if the authority of the system administrator is taken over by the malicious person. Therefore, some mechanisms in which access to computer resources, such as a system specifying execution process, files, and devices, is restricted even if a user has the authority of the system administrator have been proposed.

Examples of the mechanisms include mandatory access control (MAC). In the MAC, access to execution processes and files is controlled in accordance with a security policy (hereinafter simply referred to as a "policy") generated in advance. Japanese Patent Laid-Open No. 2012-18102 discloses a technique of the MAC.

As described above, a policy is generated in advance before the MAC is employed in an information processing apparatus. The policy is normally generated in advance by a person who configures the computer system, for example.

However, in general, a large number of unknown vulnerabilities are included in operation systems and application programs. If an unknown vulnerability is found, unauthorized access utilizing the vulnerability may be performed. Such unauthorized access is not assumed when the policy is generated in advance, and if the policy generated in advance is continuously used, the unauthorized access may be permitted. Therefore, the policy is required to be updated. However, frequent update of the policy in accordance with information on finding of an unknown vulnerability or the like is a large work load for the administrator of the computer system. On the other hand, a case where the policy is automatically updated by a specific application having a user interface may be considered. However, in this case, if the specific application is taken over by the malicious person, unauthorized access may be permitted.

SUMMARY OF THE INVENTION

Aspects of the present invention provides a technique of reducing an work load at a time of update of a security policy while security strength is maintained in the information processing apparatus having the mandatory access control function.

According to an embodiment of the present invention, there is provided an information processing apparatus including a function of mandatory access control of forcibly controlling access to an execution process or a file, the information processing apparatus including a storage unit configured to store a security policy for managing access by the mandatory access control, an obtaining unit configured to obtain information on vulnerability of an application, and an updating unit configured to update the security policy by a function of a kernel thread in accordance with the information obtained by the obtaining unit.

Further features of aspects of the present invention will become apparent from the following description of exemplary embodiments with reference to the attached drawings.

BRIEF DESCRIPTION OF THE DRAWINGS

FIG. 3 is a flowchart illustrating a policy updating process according to the first embodiment.

FIG. 4 is a flowchart illustrating a mandatory access control process according to the first embodiment.

FIGS. 6A to 6D are diagrams illustrating policies.

FIGS. 7A and 7B are diagrams illustrating access logs.

FIG. 8A is a diagram illustrating known vulnerability information, and FIG. 8B is an example of an application table.

DESCRIPTION OF THE EMBODIMENTS

A first embodiment of the present invention will be described with reference to the accompanying drawings.

First Embodiment

A first embodiment relates to an information processing apparatus having a function of mandatory access control for forcibly managing access of an application. In this embodiment, using a kernel thread function, an access log is analyzed and a policy (a security policy) of a target application is updated or newly generated. Since the kernel thread does not generally have a user interface, it is less likely that the kernel thread is operated by a malicious person. Therefore, security strength may be maintained in terms of updating of a policy.

Entire Configuration of Information Processing Apparatus

Figure 1A:
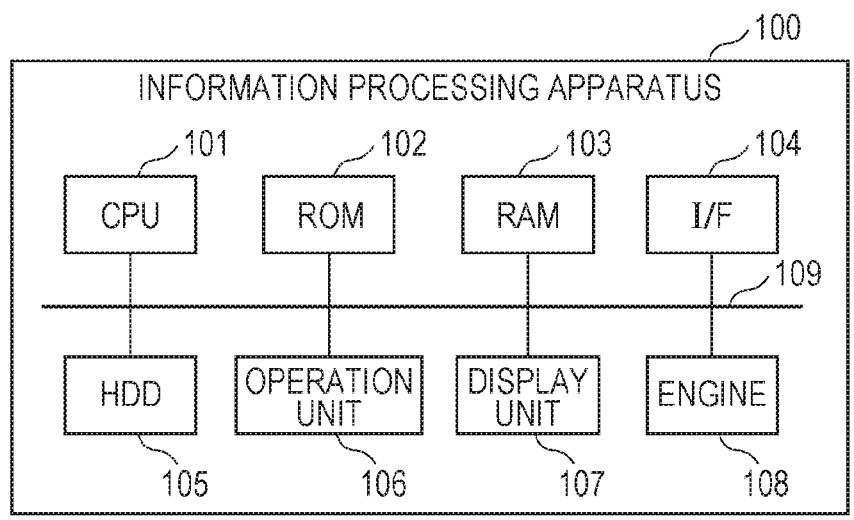
FIG. 1A is a diagram schematically illustrating an entire configuration of an information processing apparatus.

FIG. 1A is a diagram illustrating an entire configuration of an information processing apparatus 100 according to this embodiment.

The information processing apparatus 100 includes a CPU 101, a ROM (read only memory) 102, a RAM (random access memory) 103, an I/F (interface) 104, an HDD (hard disk drive) 105, an operation unit 106, a display unit 107, and an engine 108. The components are connected to one another through a bus 109.

The CPU 101 controls operations of the units included in the information processing apparatus 100 in accordance with computer programs stored in the ROM 102. Furthermore, the CPU 101 executes computer programs (such as an operating system (OS) and applications) loaded into the RAM 103. The ROM 102 is a read only memory and stores a boot program, firmware, various computer programs which realize processes described below, and various data.

The RAM 103 is a work memory which temporarily stores programs and data to be processed by the CPU 101, and various computer programs and various data are loaded into the RAM 103 under control of the CPU 101.

The I/F 104 is an interface used for communication with external apparatuses, such as network devices and USB devices. The I/F 104 performs data communication through a network and transmission and reception of data with the external apparatuses. The HDD 105 is a nonvolatile storage device which stores the OS, various computer programs, or various data.

Figure 1B:
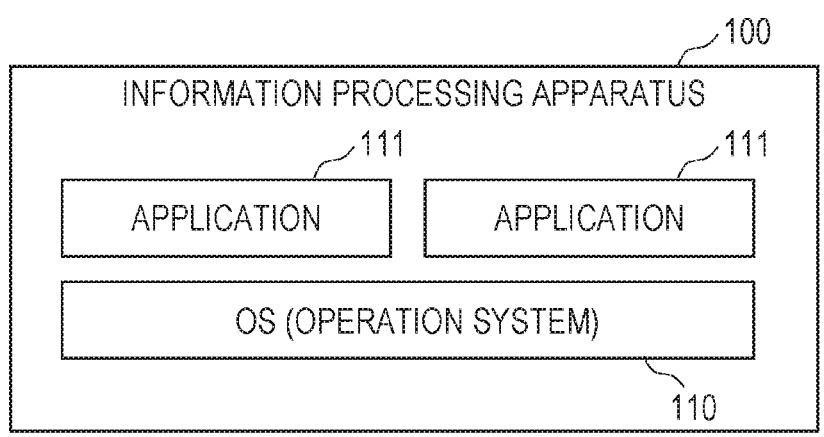
FIG. 1B is a diagram schematically illustrating a configuration of programs of the information processing apparatus.

Next, a configuration of computer programs of the information processing apparatus 100 of this embodiment is illustrated in FIG. 1B. The information processing apparatus 100 of this embodiment operates an OS 110 and a plurality of applications 111. The plurality of applications 111 are computer programs operating in the OS 110.

Any application may be employed as the applications 111 as long as the application embodies information processing. Examples of the applications 111 include a document editing application, an image editing application, and a web connection application. The examples further include a print processing application, a scan processing application, and a copy processing application. In a case where the applications 111 write data in the HDD 105, a writing process is performed through the OS 110. A reading process is similarly performed. In the reading and the writing, the OS 110 performs reading and writing on the HDD 105 after specifying a logical address of the HDD 105.

Logical Configuration of OS 110

Figure 2A:
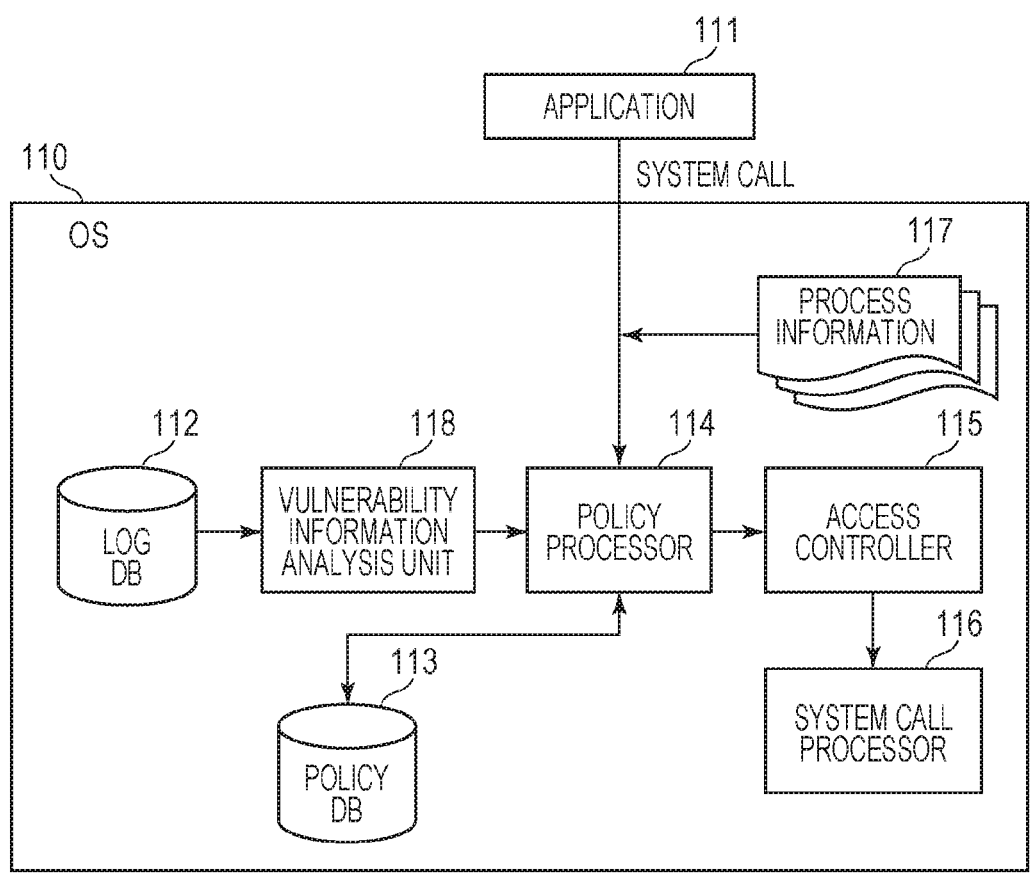
FIG. 2A is a diagram schematically illustrating a configuration of an OS according to a first embodiment.

FIG. 2A is a diagram schematically illustrating a functional configuration of the OS 110 of FIG. 1B. At least some of functions of the OS 110 described below are executed by a kernel thread.

Figure 2B:
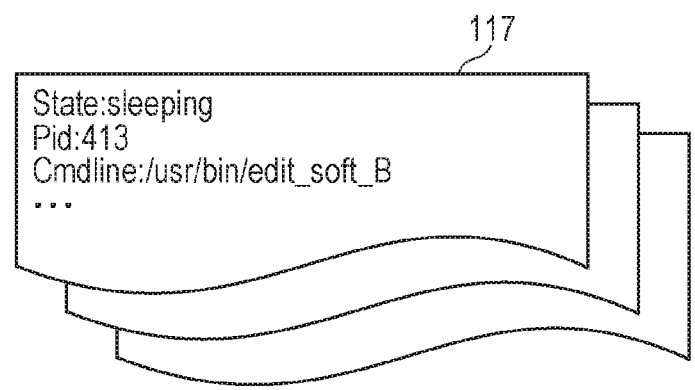
FIG. 2B is a diagram illustrating process information.

Furthermore, FIG. 2B is a diagram illustrating process information 117 of a process operating in the OS 110. Functions of the OS 110 are realized when the CPU 101 executes program codes of the OS 110.

A vulnerability information analyzer 118 is a resident process activated when the OS 110 is activated.

After being activated, the vulnerability information analyzer 118 analyzes an access log of a system periodically (every hour, every day, or the like) obtained from a log DB 112 and supplies a result of the analysis to a policy processor 114.

The policy processor 114 performs the following process when receiving the access log analysis result from the vulnerability information analyzer 118 or a system call from one of the applications 111 to be controlled and the process information 117. When receiving the access log analysis result, the policy processor 114 updates or newly generates a policy in accordance with the analysis result and supplies the policy to a policy DB 113. On the other hand, when receiving the system call and the process information 117, the policy processor 114 supplies a policy corresponding to the system call to an access controller 115. Here, the process information 117 is illustrated in FIG. 2B. "Status" in a first line indicates information on a process, and "sleeping" indicating a dormant state, "running" indicating an execution state, or the like is assigned as "Status". "Pid" in a second line indicates an identifier of a process, and "Cmdline" in a third line indicates a path of an execution file.

If the policy processor 114 has an interface, such as a keyboard or a mouse, or a network, the policy processor 114 may be taken over by the malicious person. Therefore, in this embodiment, the policy processor 114 functions as a kernel thread of the OS 110 which does not have a user interface. A target of access and processes to be controlled by the mandatory access control is a program included in a user space, such as an application and a command of the OS 110. The kernel thread is a function processed in a kernel space which is different from the user space. Therefore, it is difficult for a user to access the kernel space unless a user interface for access from the user space is explicitly implemented. Accordingly, a take-over by the malicious person may be prevented.

The access controller 115 refuses a request obtained from the system call in accordance with a policy corresponding to the application 111 to be controlled. When the request is not refused, the request is input to a system call processor 116. The system call processor 116 performs a system call process corresponding to the request. The functional configuration of the OS 110 of this embodiment has been described above.

Next, the mandatory access control process and the policy updating process performed by the OS 120 will be described.

Mandatory Access Control Process

FIG. 4 is a flowchart illustrating the mandatory access control process executed by the OS 110 stored in the ROM 102. The mandatory access control process will be described hereinafter with reference to the components illustrated in FIG. 2A.

First, in step S401 of FIG. 4, the policy processor 214 of FIG. 2A obtains a system call (a request for the OS 110) issued by the application 111.

In step S402, the policy processor 114 of FIG. 2A determines whether the mandatory access control is to be performed. When the mandatory access control is to be performed (YES), the process proceeds to step S403. In step S403, the policy processor 124 of FIG. 2A inputs policies of applications from the policy DB 113 and supplies the policies to the access controller 115.

On the other hand, when the mandatory access control is not to be performed in step S402 (NO), the process proceeds to step S405. In step S405, the system call processor 116 of FIG. 2A performs a system call process of processing the request from the application 111, and the process of the OS 110 is terminated.

In step S404, the access controller 115 of FIG. 2A determines whether a request for access to a computer resource by the application 111 is to be permitted in accordance with the input policies. When the access request is permitted (YES), the process proceeds to step S405. In step S405, the system call processor 116 of FIG. 2A performs a system call process of processing the request from the application 111, and the process of the OS 110 is terminated.

A case where a request for reading of a file "/usr/local/user_data/text.txt" by an application "App1" is input will be described as an example. If the request is input, a policy 601 of FIG. 6A is input. A path of an execution file of an application is described in a field 601a in the policy 601 so as to indicate an application corresponding to the policy. In a field 601b, detailed rules are described in individual lines for individual files. Anterior halves of the individual lines indicate path names of the files whereas posterior halves indicate permitted control information. When "read" is described, reading is permitted whereas when "write" is described, writing is permitted. For example, a line 601c indicates that reading of a file "/usr/bin/App1" is permitted. Note that rules for a plurality of files may be collectively described in one line using a special symbol. For example, "/usr/local/user_data/*read" in a line 601d indicates that reading of all files below a "usr/local/user_data" folder is permitted.

Since reading of "text.txt" below the "/usr/local/user_data" folder is permitted in this time, this request is permitted and the process is executed. On the other hand, the access request is not permitted in step S404 (NO), the request is refused and the process of the OS 110 is terminated.

Policy Updating Process

FIG. 3 is a flowchart illustrating the policy updating process executed by the OS 110 in detail. The policy updating process will be described hereinafter with reference to the components illustrated in FIG. 2A. Note that this process is periodically performed at a predetermined time interval. For example, the process is performed every hour or every day.

First, in step S301 of FIG. 3, the vulnerability information analyzer 118 illustrated in FIG. 2A obtains an access log from the log DB 112. An access log 701 of FIG. 7A, an access log 702 of FIG. 7B, or the like is obtained, for example.

Figure 9A:
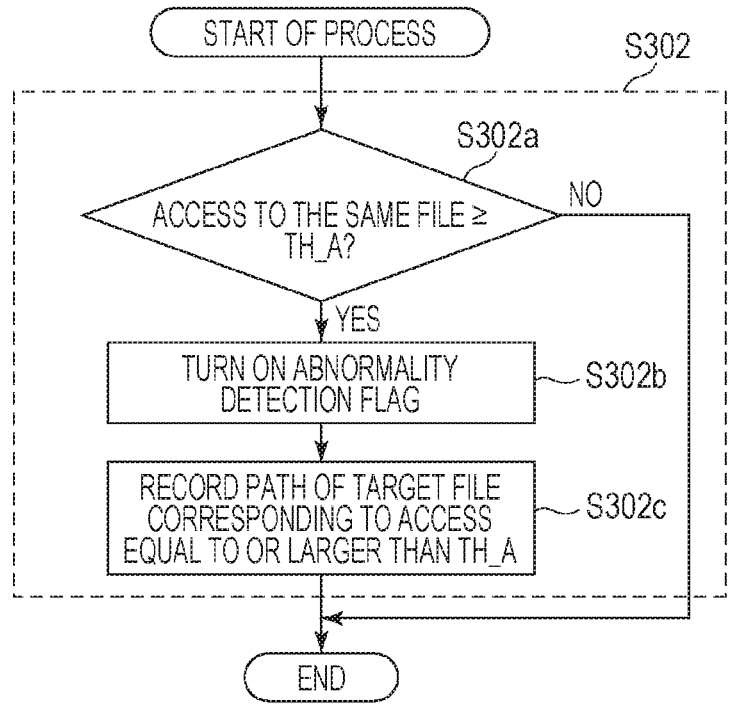
FIGS. 9A and 9B are flowcharts illustrating access log analysis processes according to the first embodiment.
Figure 9B:
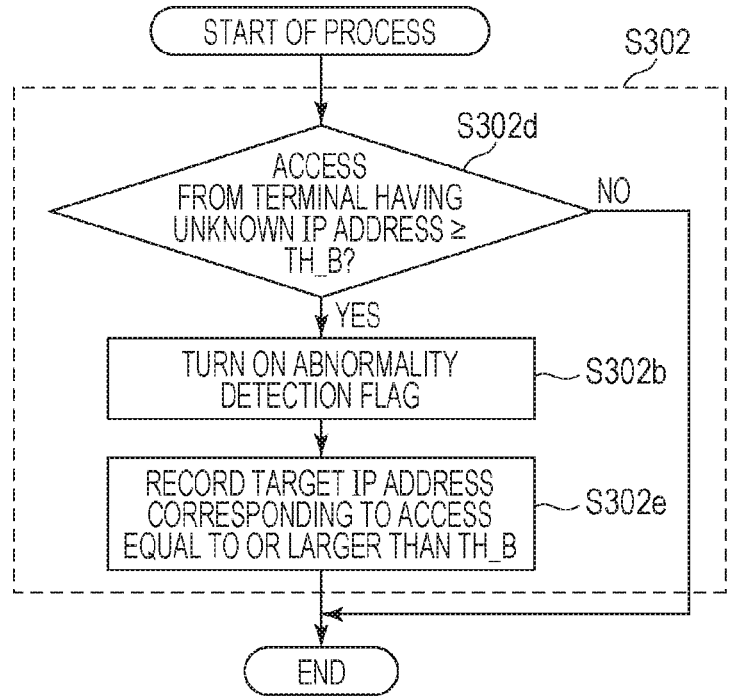

Next, in step S302, the vulnerability information analyzer 118 illustrated in FIG. 2A analyzes the access log obtained in step S301 of FIG. 2A. The analysis is performed to detect an abnormal access. The detailed process in step 2 is illustrated in FIGS. 9A and 9B. As the detailed process in step S302, processes illustrated in FIGS. 9A and 9B will be described.

In the process of FIG. 9A, an abnormal access is determined by a result of a determination as to whether the number of time access to the same file is performed is abnormally large.

First, in step S302a, it is determined whether the number of times the same file is accessed is equal to or larger than a predetermined threshold value TH_A. For example, 100 may be set as the threshold value TH_A. When the determination is affirmative in step S302a (YES), the process proceeds to step S302b where an abnormality detection flag is turned on. An initial value of the abnormality detection flag is "OFF" before the policy updating process is performed. When the determination is negative in step S302a (NO), the process is terminated.

In a case of the access log 701 of FIG. 7A, when file access in individual lines in a field 701a is counted, it is recognized that the file "text.txt" is accessed 140 times, and accordingly, the number of times the file "text.txt" is accessed is equal to or larger than the threshold value TH_A. In step S302c, a path of the target file corresponding to the number of times the file is accessed which is equal to or larger than the threshold value TH_A is recorded. The process of FIG. 9A is thus executed.

On the other hand, in the process of FIG. 9B, abnormal access is determined by a result of a determination as to whether the number of times access is performed by an unknown IP address is abnormally large.

First, in step S302d, it is determined whether the number of times access is performed by a terminal having an unknown IP address is equal to or larger than a threshold value TH_B. For example, 10 is set as the threshold value TH_B. When the determination is affirmative (YES), the process proceeds to step S302b where the abnormality detection flag is turned on. When the determination is negative (NO), the process is terminated. For example, in a case of the access log 702 of FIG. 7B, it is recognized that the numbers of times access is performed by a terminal having an unknown IP address "XXX.XXX.XXX.YYY" is 30 when unknown IP addresses in a field 702a are counted. Accordingly, the number of times access is performed by the terminal having the unknown IP address "XXX.XXX.XXX.YYY" is equal to or larger than the threshold value TH_B. In step S302e, the IP address of the terminal which made access the number of times equal to or larger than the threshold value TH_B is recorded. The process of FIG. 9B is thus executed.

Note that, in step S302, the number of times the same file is accessed or the number of times access is made from the same IP address may be obtained by a character string count using a shell script, Perl, or the like.

In step S303, the vulnerability information analyzer 118 illustrated in FIG. 2A determines whether abnormality has been detected by detecting the abnormality detection flag. When the abnormality detection flag is in an on state, that is, abnormality is detected (YES), the process proceeds to step S304. Then the policy processor 114 illustrated in FIG. 2A inputs policies for individual applications from the policy DB 113. When the abnormality detection flag is in an off state, that is, abnormality is not detected (NO), the process is terminated.

In step S305, the policy processor 114 illustrated in FIG. 2A determines whether the application in which the abnormality is detected has a policy. When the application has a policy (YES), the process proceeds to step S306 where the policy processor 114 illustrated in FIG. 2A updates the policy and terminates the process. There are two updating methods. First, only rules in which access to a file which has been abnormally accessed and access from an IP address corresponding to abnormal access are refused are added. Assuming that the policy 601 of FIG. 6A is an original policy, rules 602b and 602c of FIG. 6B are added. When "deny" is described in a leading portion of a rule, a negative rule is made. Note that the rule 602c refuses "all" access from the IP address "XXX.XXX.XXX.YYY". The other of the two updating methods is a method for enlarging a range to be refused and adding a rule. If access to a folder including a file which is abnormally accessed is to be refused or an IP address which made abnormal access is detected, only a rule in which all external IP addresses are refused is added. Assuming that the policy 601 of FIG. 6A is an original policy, rules 603b and 603c of FIG. 6C are added. Note that the rule 603c refuses "all" access from all external IP addresses "OUTSIDE_IP_ALL". Furthermore, other updating methods may be appropriately employed.

On the other hand, if the application does not have a policy in step S305 (NO), the process proceeds to step S307 wherein the policy processor 114 of FIG. 2A newly generates a policy, and thereafter, the process is terminated. As the generation of a new policy, first, a policy only including a path of the execution file of the application illustrated in the field 601a of FIG. 6A and a rule for permission of reading of the execution file illustrated in the field 601b of FIG. 6A is generated as a base. Thereafter, a rule for refusing reading of the file corresponding to abnormal access is added.

Note that, in this embodiment, a policy is updated when abnormal access is detected. However, the original policy may be used again when abnormal access is stopped or a patch of the application against the abnormal access is applied. Furthermore, a function of adjusting the policy in accordance with a user's operation may be employed.

Second Embodiment

In the first embodiment, the access log is analyzed first. Then, in a case where it is determined that a specific application is attacked, a policy of the application is updated or newly generated using a kernel thread. In a second embodiment, in a case where an application does not cope with newly-detected vulnerability, a policy is updated or newly generated in accordance with the newly-detected vulnerability using a kernel thread. By this, the application may cope with the newly-detected vulnerability without manually updating or newly generating a policy.

The second embodiment is different from the first embodiment only in a portion of the logical configuration of an OS 110 and a policy updating process. Therefore, only points of the logical configuration of the OS 110 which are different from the first embodiment and the policy updating process are described.

Logical Configuration of OS 110

Figure 10:
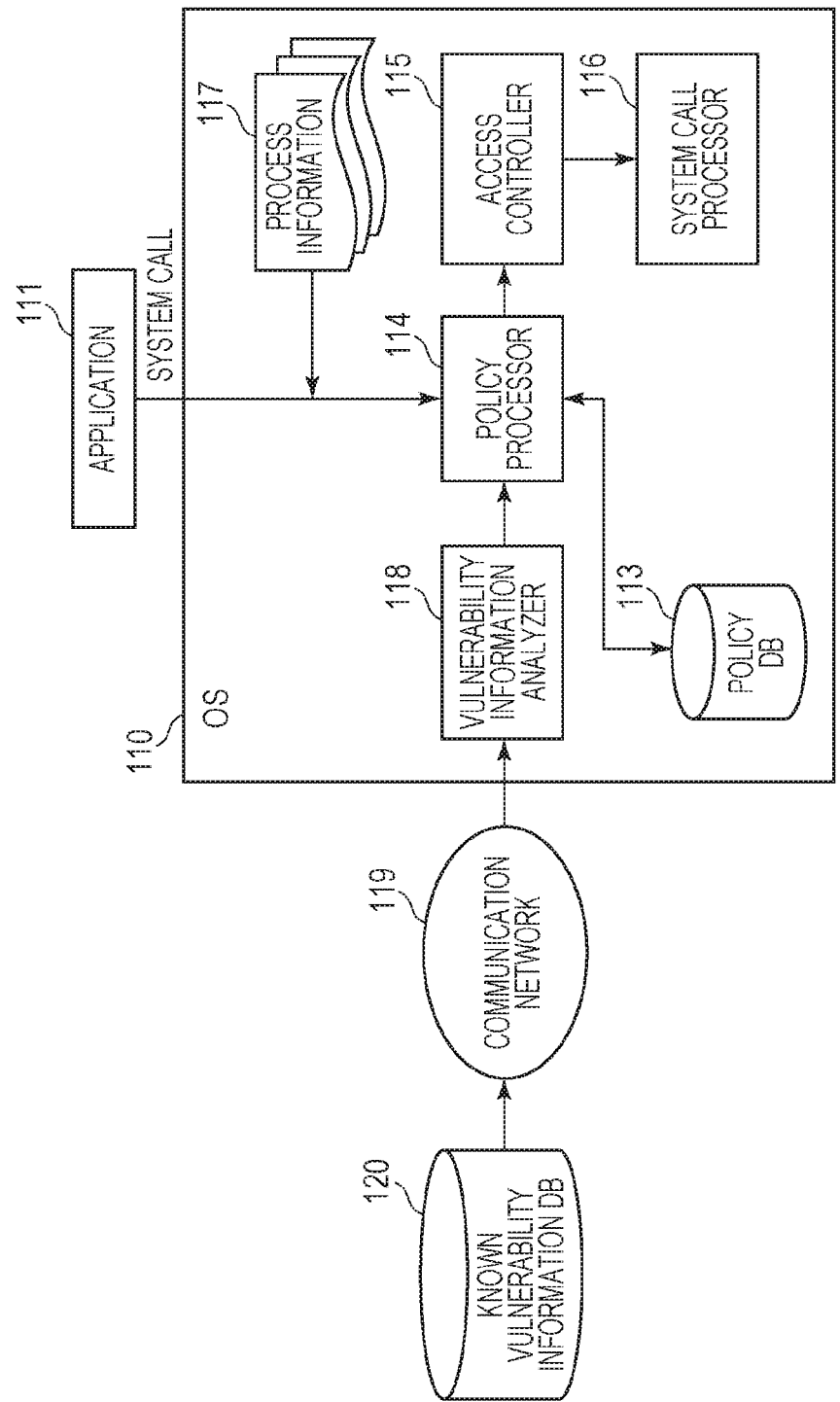
FIG. 10 is a diagram schematically illustrating a configuration of an OS according to the second embodiment.

FIG. 10 is a diagram schematically illustrating a functional configuration of the OS 110 according to the second embodiment. Functions of the OS 110 are realized when the CPU 101 executes program codes of the OS 110. Furthermore, a policy DB 113, an access controller 115, a system call processor 116, and process information 117 of the second embodiment are the same as those of FIG. 2A, and therefore, descriptions thereof are omitted.

A vulnerability information analyzer 118 is a resident process activated when the OS 110 is activated. After the activation, the vulnerability information analyzer 118 obtains newly-detected vulnerability information from a known vulnerability information DB 120 through a communication network 119 in an outside of the OS 110. An interval of the obtainment of the vulnerability information is set as "every hour" or "every day", for example. The newly-detected vulnerability information is represented by common vulnerabilities and exposures (CVE), for example, as illustrated in FIG. 8A. Thereafter, the newly-detected vulnerability information is compared with an application table illustrated in FIG. 8B included in the OS 110 before the newly-detected vulnerability information is analyzed. After the analysis, a result of the analysis is supplied to the policy processor 114.

Furthermore, the policy processor 114 performs the following process when receiving the result of the analysis of the newly-detected vulnerability information from the vulnerability information analyzer 118 or a system call from an application 111 to be controlled and the process information 117. When receiving the result of the analysis of the newly-detected vulnerability information, the policy processor 114 updates or newly generates a policy in accordance with the analysis result and supplies the policy to a policy DB 113. On the other hand, when receiving the system call and the process information 117, the policy processor 114 supplies a policy corresponding to the system call to an access controller 115.

Here, as with the first embodiment, the policy processor 114 functions as the kernel thread which does not have a user interface. Accordingly, a take-over by the malicious person may be prevented.

Policy Updating Process

Figure 5:
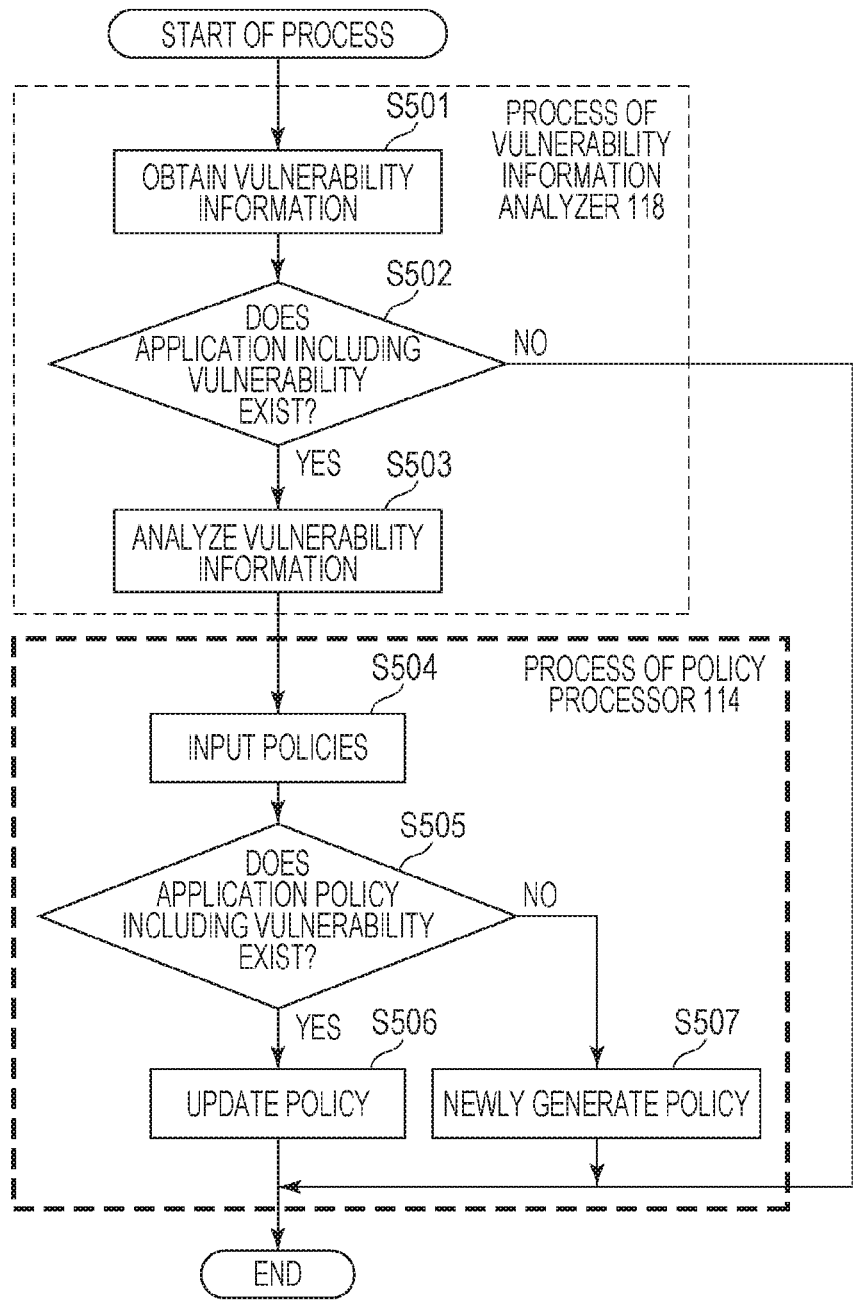
FIG. 5 is a flowchart illustrating a policy updating process according to a second embodiment.

FIG. 5 is a flowchart illustrating the policy updating process executed by the OS 110 in detail. The policy updating process will be described with reference to the components illustrated in FIG. 2A. Note that, as with the first embodiment, this process is periodically performed.

First, in step S501 of FIG. 5, the vulnerability information analyzer 118 illustrated in FIG. 2A obtains newly-detected vulnerability information from a known vulnerability information DB implemented in an outside of the OS 110. For example, vulnerability information illustrated in FIG. 8A is obtained.

In step S502, the vulnerability information analyzer 118 illustrated in FIG. 2A determines whether an application corresponding to detected vulnerability exists. This determination is made by comparing information on an application described in the vulnerability information with the application table included in the OS 110. Specifically, first, a determination as to whether an application name described in the application table is included in a title or summary of the vulnerability information is made using general character string search. In a case where the application name is detected in the search, a determination as to whether a version is matched is similarly made using the character string search. In a case where the vulnerability information of FIG. 8A and the application table of FIG. 8B are used, for example, an application name in "App1 before 5" in a field 801a matches "App1" in a field 802a. Next, according to "App1 before 5" in the field 801a, a version is "before 5", and accordingly, "4.2" in a field 802b is detected. Accordingly, it is recognized that the version does not cope with the vulnerability information.

In a case where an application corresponding to detected vulnerability exists in step S502 (YES), the process proceeds to step S503 where the vulnerability information is analyzed. A position of the vulnerability in the application is analyzed as much as possible from character strings "func" and "process" indicating a function and a process, respectively. In a case of the vulnerability information of FIG. 8, for example, it is detected that a "hoge" function has vulnerability.

On the other hand, in a case where an application corresponding to detected vulnerability does not exist in step S502 (NO), the process is terminated.

In step S504, the policy processor 114 illustrated in FIG. 2A inputs policies for individual applications from the policy DB 113.

In step S505, the policy processor 114 illustrated in FIG. 2A determines whether the application in which the abnormality is detected has a policy. When the application has a policy (YES), the process proceeds to step S506 where the policy processor 114 illustrated in FIG. 2A updates the policy and terminates the process. In the case of the vulnerability information of FIG. 8A, for example, a rule for refusing data associated with the "hoge" function is added. In this case, the policy 601 of FIG. 6A is changed to a policy 604 of FIG. 6D. A rule 604b is added to refuse data associated with the "hoge" function. Furthermore, as described in step S306 in the first embodiment, a method for enlarging a range to be refused and adding a rule or other updating method may be appropriately employed.

On the other hand, if the application in which the abnormality is detected does not have a policy in step S505 (NO), the process proceeds to step S507 where the policy processor 114 of FIG. 2A newly generates a policy, and thereafter, the process is terminated. A policy is newly generated similarly to the example illustrated in step S307 of the first embodiment.

Note that, in the second embodiment, a policy is updated or newly generated in a case where an application corresponding to newly-detected vulnerability information exists. However, only serious vulnerability may be coped with but trivial vulnerability may not be coped with so that a load of a process of updating a policy or a process of newly generating a policy may be reduced. Specifically, a base score of a common vulnerability scoring system (CVSS) of vulnerability is described in the CVE, for example. It may be determined that the higher the score is, the more serious vulnerability is. Therefore, only when the base score is equal to or larger than a certain score, a policy may be updated or newly generated.

Third Embodiment

In the first embodiment, the access log is analyzed first. Then, it is determined that a specific application is attacked, a policy of the application is updated or newly generated using a kernel thread which does not have a user interface.

In the second embodiment, in a case where an application does not cope with newly-detected vulnerability, a policy of the application is updated or newly generated in accordance with information on the newly-detected vulnerability using a kernel thread which does not have a user interface.

In a third embodiment, the two embodiments described above are combined with each other. By this, a policy which copes with both of unknown vulnerabilities and newly-detected vulnerability may be efficiently updated or newly generated.

The third embodiment is different from the first embodiment only in a portion of a logical configuration of an OS 110 and a policy updating process. Therefore, only points of the logical configuration of the OS 110 which are different from the first embodiment and a policy updating process will be described hereinafter.

Logical Configuration of OS 110

Portions different from the first embodiment are described as follows. A vulnerability information analyzer 118 is a resident process activated when the OS 110 is activated. After being activated, the vulnerability information analyzer 118 analyzes an access log of a system obtained from a log DB 112 and supplies a result of the analysis to a policy processor 114. In addition, a newly-detected vulnerability information is obtained from a known vulnerability information DB 120 through a communication network 119 implemented in an outside of the OS 110 as illustrated in FIG. 10. Thereafter, the newly-detected vulnerability information is compared with an application table illustrated in FIG. 8B included in the OS 110. After the comparison, the newly-detected vulnerability information is analyzed and a result of the analysis is supplied to the policy processor 114.

Furthermore, the policy processor 114 performs the following process when receiving an access log or the result of the analysis of the newly-detected vulnerability information from the vulnerability information analyzer 118 or a system call from an application 111 to be controlled and process information 117. When receiving an access log or the result of the analysis of the vulnerability information, the policy processor 114 updates or newly generates a policy in accordance with the analysis result and supplies the policy to a policy DB 113. On the other hand, when receiving the system call and the process information 117, the policy processor 114 supplies a policy corresponding to the system call to an access controller 115.

Here, as with the first embodiment, the policy processor 114 functions as the kernel thread which does not have a user interface. Accordingly, take-over by an attacker is prevented. The portions different from the first embodiment are described hereinabove, and the other portions are the same as those of the first embodiment.

Policy Updating Process

In this embodiment, both of the policy updating process according to the first embodiment and the policy updating process according to the second embodiment are periodically performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-040749, filed Mar. 2, 2015, which is hereby incorporated by reference herein in its entirety.

What is claimed is:

1. An information processing apparatus including a function of mandatory access control, the information processing apparatus comprising:

one or more hardware processors to execute instructions which, when executed, cause the one or more hardware processors to:

store, in a storage, a security policy for controlling access of a plurality of applications by the mandatory access control of forcibly controlling access to at least one of an execution process and a file regardless of whether, for each of the plurality of applications, authority for access is provided to a user using a target application in the plurality of applications such that the user who has access permissions is unable to access at least one of the execution process and the file by using the target application, wherein the security policy indicates whether the plurality of applications can access at least one of the execution process and the file, obtain information on vulnerability of a specific application in the plurality of applications, and update a particular policy of the specific application by a function of a kernel thread in accordance with the obtained information, wherein the particular policy of the specific application is included in the security policy so as to enable updating of the security policy separately for each of the plurality of applications.

2. The information processing apparatus according to claim 1, wherein the obtained information is a log indicating whether a number of times access is performed by the specific application is greater than a predetermined value.

3. The information processing apparatus according to claim 1, wherein execution of the instructions further cause the one or more hardware processors to:
determine whether a number of times the specific application accesses a certain file is greater than or equal to a predetermined value,
wherein the security policy is updated by the function of the kernel in a case where the number of times the specific application accesses the certain file is greater than or equal to the predetermined value.

4. The information processing apparatus according to claim 1, wherein the obtained information is information on a newly found vulnerability for the specific application.

5. The information processing apparatus according to claim 4, wherein the security policy is updated by the function of the kernel in a case where an application corresponding to the newly found vulnerability is included in the information processing apparatus.

6. The information processing apparatus according to claim 5, wherein, in a case where a security patch is applied to the specific application after the security is updated, execution of the instructions further cause the one or more hardware processors to update again the security policy to revert the security policy to an original state.

7. The information processing apparatus according to claim 1, wherein execution of the instructions further cause the one or more hardware processors to update the security policy by adding a rule for refusing certain access by the specific application to a group of rules of the security policy using the function of the kernel.

8. The information processing apparatus according to claim 1, wherein execution of the instructions further cause the one or more hardware processors to update the security policy by newly generating a security policy including a rule for refusing certain access by the specific application using the function of the kernel.

9. The information processing apparatus according to claim 1, wherein the specific application is configured to operate in an operating system installed on the information processing apparatus.

10. The information processing apparatus according to claim 1,
wherein the security policy is for controlling access of a plurality of specific applications by the mandatory access control, and
wherein the security policy indicates whether each of the plurality of the specific applications can access at least one of the execution process and the file.

11. A method for controlling an information processing apparatus including a function of mandatory access control, the method comprising:
storing, in a storage, a security policy for controlling access of a plurality of applications by the mandatory access control of forcibly controlling access to at least one of an execution process and a file regardless of whether, for each of the plurality of applications, authority for access is provided to a user using a target application in the plurality of applications such that the user who has access permissions is unable to access at least one of the execution process and the file by using the target application, wherein the security policy indicates whether the plurality of applications can access at least one of the execution process and the file;
obtaining information on vulnerability of a specific application in the plurality of applications; and
updating a particular policy of the specific application by a function of a kernel thread in accordance with the obtained information, where the particular policy of the specific application is included in the security policy so as to enable updating of the security policy separately for each of the plurality of applications.

12. A non-transitory computer-readable storage medium storing computer executable instructions to cause a computer to execute a method for controlling an information processing apparatus including a function of mandatory access control, the method comprising:
storing, in a storage, a security policy for controlling access of a plurality of applications by the mandatory access control of forcibly controlling access to at least one of an execution process and a file regardless of whether, for each of the plurality of applications, authority for access is provided to a user using a target application in the plurality of applications such that the user who has access permissions is unable to access at least one of the execution process and the file by using the target application, wherein the security policy indicates whether the plurality of applications can access at least one of the execution process and the file;
obtaining information on vulnerability of a specific application in the plurality of applications; and
updating a particular policy of the specific application by a function of a kernel thread in accordance with the obtained information, where the particular policy of the specific application is included in the security policy so as to enable updating of the security policy separately for each of the plurality of applications.

13. An information processing apparatus including a function of mandatory access control, the information processing apparatus comprising:
a storage to store a security policy for controlling access of a plurality of applications by the mandatory access control of forcibly controlling access to at least one of an execution process and a file regardless of whether, for each of the plurality of applications, authority for access is provided to a user using a target application such that the user who has access permissions is unable to access a computer resource depending on the target application used by the user, wherein the security policy indicates whether the plurality of applications can access at least one of the execution process and the file, and
one or more hardware processors to execute instructions which, when executed, cause the one or more hardware processors to:
obtain information on vulnerability of a specific application in the plurality of applications, and
update a particular policy of the specific application by a function of a kernel thread in accordance with the obtained information, wherein the particular policy of the specific application is included in the security policy so as to enable updating of the security policy separately for each of the plurality of applications.

14. The information processing apparatus according to claim 13, wherein the obtained information is a log indicating whether a number of times access performed by the specific application is greater than a predetermined value.

15. The information processing apparatus according to claim 13, wherein execution of the instructions further cause the one or more hardware processors to:
determine whether a number of times the specific application accesses a certain file is greater than or equal to a predetermined value,
wherein the security policy is updated by the function of the kernel thread in a case where the number of times the specific application accesses the certain file is greater than or equal to the predetermined value.

16. The information processing apparatus according to claim 13, wherein the obtained information is information on a newly found vulnerability for the specific application.

17. The information processing apparatus according to claim 16, wherein the security policy is updated by the function of the kernel thread in a case where an application corresponding to the newly found vulnerability is included in the information processing apparatus.

18. The information processing apparatus according to claim 17, wherein, in a case where a security patch is applied to the specific application after the security is updated, execution of the instructions further cause the one or more hardware processors to update again the security policy to revert the security policy to an original state.

19. The information processing apparatus according to claim 13, wherein execution of the instructions further cause the one or more hardware processors to update the security policy by adding a rule for refusing certain access by the specific application to a group of rules of the security policy using the function of the kernel thread.

20. The information processing apparatus according to claim 13, wherein execution of the instructions further cause the one or more hardware processors to update the security policy by newly generating a security policy including a rule for refusing certain access by the specific application using the function of the kernel thread.

* * * * *